E. H. WARING.
BEARING SURFACE FOR MACHINERY.
APPLICATION FILED MAY 26, 1913.
1,236,511.
Patented Aug. 14, 1917.
2 SHEETS—SHEET 2.
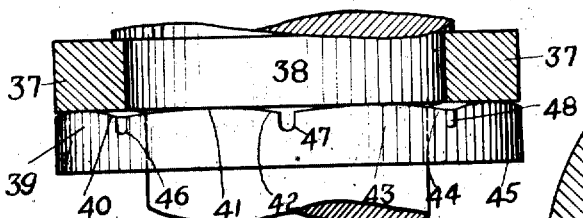
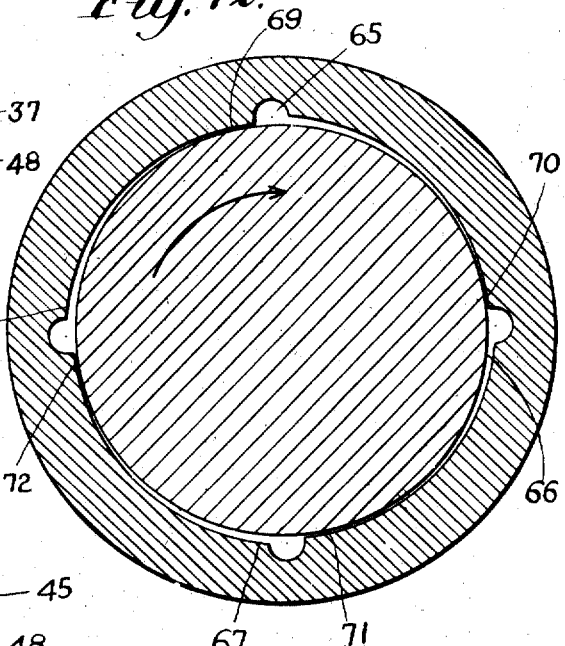
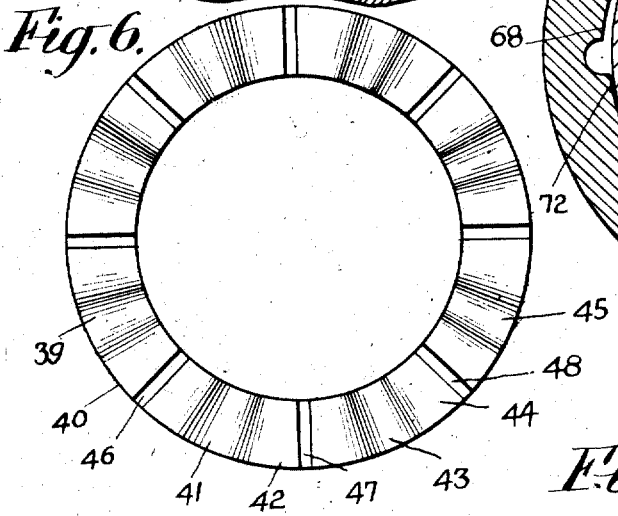
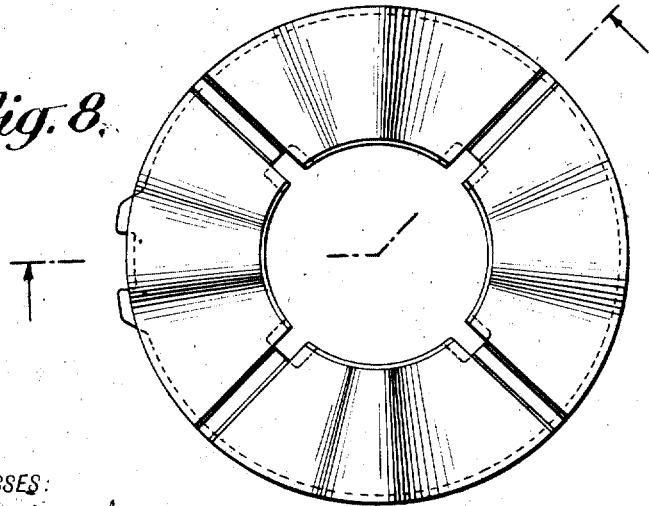
WITNESSES:
INVENTOR
Edward H. Waring
BY
Francis B. Crocker
ATTORNEY

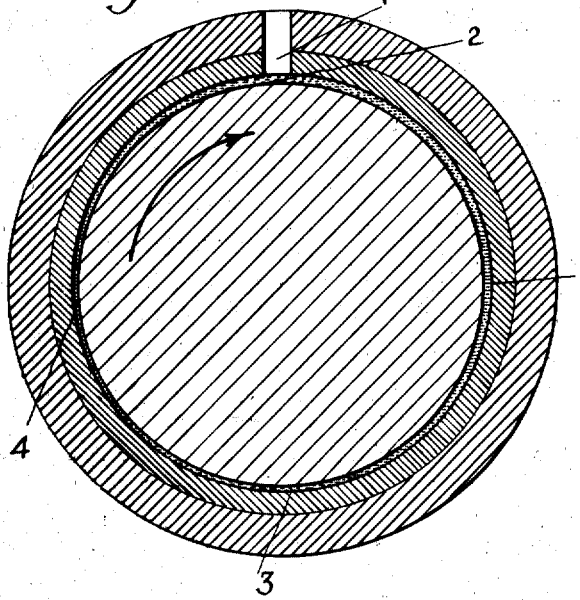
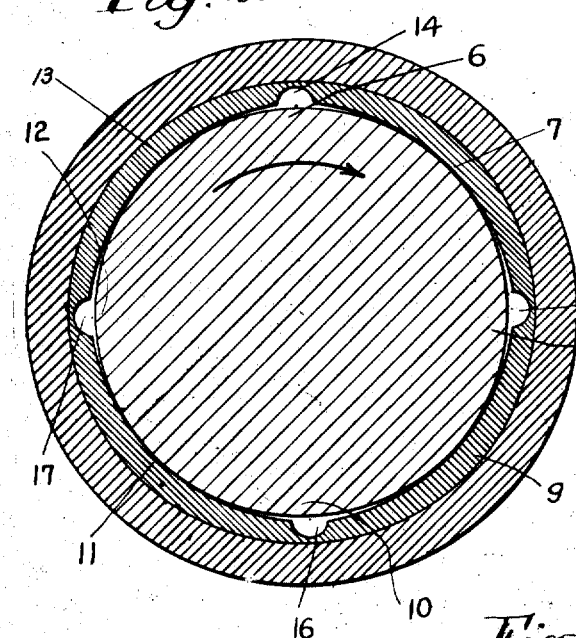
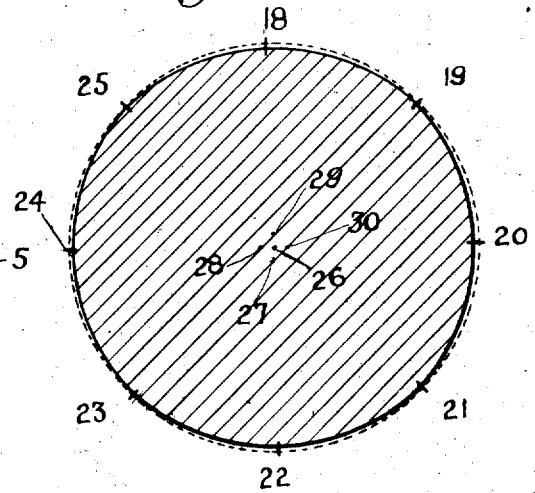
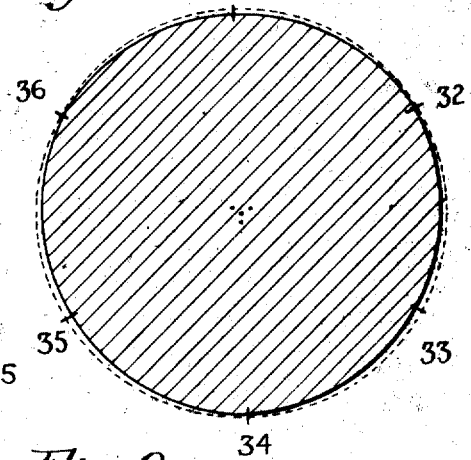
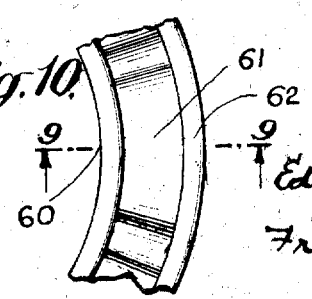

UNITED STATES PATENT OFFICE.

EDWARD H. WARING, OF GLEN RIDGE, NEW JERSEY, ASSIGNOR TO CROCKER-WHEELER COMPANY, OF AMPERE, NEW JERSEY, A CORPORATION OF NEW JERSEY.

BEARING-SURFACE FOR MACHINERY.

1,236,511.  Specification of Letters Patent.  Patented Aug. 14, 1917.

Application filed May 26, 1913. Serial No. 769,992.

*To all whom it may concern:*

Be it known that I, EDWARD H. WARING, a citizen of the United States, residing at Glen Ridge, in the county of Essex and State of New Jersey, have invented certain new and useful Improvements in Bearing-Surfaces for Machinery.

My invention relates, for example, to the journals and journal boxes of horizontal or other bearings which have or approximate the cylindrical or conical form. It also relates to vertical bearings or others that sustain a longitudinal force or thrust in the direction of the axis of the shaft. It is applicable also to worm gearing, screws, nuts and in general my invention relates to bearing surfaces having relative movement with respect to each other.

The object of my invention is to obtain and maintain very effective lubrication of such surfaces in order to reduce to a minimum the friction between them with the loss of energy, heating, wear, shut downs, repairs and other troubles resulting therefrom. In the case of bearing surfaces having high speed with respect to each other, those between which heavy pressure is exerted, thrust bearings, vertical bearings, step bearings and worm gearing for all of which it is notoriously difficult to insure effective lubrication, my invention is especially advantageous.

To obtain these important advantages, the bearing surfaces constructed in accordance with my invention are made so that the whole or a portion of one or both of them are slightly undulating instead of being cylindrical, conical, flat or having other usual forms including the threads or surfaces of screws, nuts and worm gearing.

In some instances I provide in combination with such surfaces certain channels or inlets to admit the oil or other lubricant, which may be a solid, liquid, vapor or gas, and certain ridges or rims to aid in retaining it between the bearing surfaces.

In order to set forth the nature and merits of my invention I shall first explain briefly some of the principal facts in regard to lubrication and then describe the several modified forms of my bearings. These facts and forms of bearings are illustrated in the accompanying drawing.

Figure 1 is a sectional view of an ordinary horizontal journal and journal box, indicating the typical conditions that exist in that case. Fig. 2 is a corresponding sectional view of a journal and journal box, the latter being made with a slightly undulating surface in accordance with my invention. The conditions existing in this case are shown. Fig. 3 represents a section of a journal made with a slightly undulating surface according to my invention. Fig. 4 shows a section of a modified form of a similar journal, according to my invention. Fig. 5 is a side view of a portion of a thrust bearing designed to carry a vertical shaft, the construction being in accordance with my invention. Fig. 6 is a plan view of a washer that forms part of the vertical thrust bearing represented in Fig. 5. Fig. 7 is a section and Fig. 8 a plan view of a more elaborate form of such a washer. Fig. 9 is a section and Fig. 10 a plan view of a portion of a modified form of my washer and collar. Fig. 11 is a section of another modification of my washer and collar. Fig. 12 is a section of a journal and a modified form of my journal box.

The condition essential to the proper lubrication of surfaces that bear or tend to bear upon each other and have relative movement, is the existence of a film of oil or other lubricant between them. It is necessary not only to form such a film at the start, but it is also requisite that this film should be maintained wherever these surfaces tend to press against one another at all times when there is relative motion between them.

With such a film of good lubricating oil produced and maintained between surfaces composed of suitable metals, the coefficient of friction is very low. Its exact value depends, of course, upon the pressure per unit area, the viscosity of the oil, as well as upon numerous other conditions; but under favorable circumstances the coefficient of friction is as low as .005 or one-half of one per cent. If, however, the proper film of lubricant is not present, even though the surfaces are still oily, the coefficient of friction is likely to become five or even ten times as great, with a corresponding increase in energy loss, heating, wear and other troubles. For almost all practical machinery the difference between the two conditions is far more than a matter of degree in fact, it is usually not feasible to operate high speed machinery unless the lubricating film is maintained between parts that bear or tend to bear and move upon each other. When such a film is maintained there is no actual contact between the metal surfaces and there is only fluid friction, very much as if the parts were floating in oil. If, however, the oil film fails or is forced out, then the metal surfaces come into actual contact which greatly increases the friction. The difference between the two cases is analogous to the towing of a boat in water and the dragging of the same boat on land. To carry the analogy further: the mere fact that the bearing surfaces may be wet with oil but without an oil film between them, is not real lubrication any more than wetting the ground and boat would give real flotation.

A practical example of the positive maintenance of a lubricating oil-film is found in a certain well-known type of thrust or step bearings. In this device the thrust or weight is sustained by flat rings or disks between which an oil-film is maintained by introducing oil under very high pressure at the interior. In flowing to the exterior and there escaping, the oil actually forces the surfaces apart and thus carries the thrust or weight. The separation of the surfaces undoubtedly occurs, in fact, it has been measured in thousandths of an inch. This form of bearing while effective, is only applicable to large and special apparatus, being out of the question for any ordinary machinery on account of the complication and expense of maintaining the constant supply of oil at very high pressure, also the serious consequences that might result from failure of the oil supply. For the vast majority of cases, bearings must form and maintain their own oil-films in a simple way without involving much expense or additional parts.

Let us consider the ordinary horizontal bearing, a simple section of which is represented in Fig. 1. As usually constructed, there is a small clearance between the journal and the journal box. This clearance is exaggerated in Fig. 1 but it is ordinarily sufficient to permit the formation of an oil-film between the surfaces of the journal and the box. The common practice is to supply oil on top of the journal at 2, either from a reservoir or self-oiling device. This oil is carried around by the journal and forms an oil-film, as indicated in Fig. 1. In the case of some high speed bearings, however, it may not be desirable to have such a clearance and therefore looseness between the journal and journal box; hence there may not be sufficient space in which a film of oil can be properly formed. On the other hand, an excessive amount of clearance makes it difficult to form and to maintain oil films. It often happens also, under practical conditions, that the pressure exerted between the journal and box becomes sufficient to force out the oil and break the film even though the clearance space is ample for its formation. This excessive pressure may be only temporary or it may be due to a peculiar combination of weight of parts, side stress of belting or gearing, magnetic pull in electrical machinery or other condition. If the oil-film is broken at any point in the ordinary bearing, it may not be reformed until after the point of supply of the oil is reached again in the rotation of the journal.

I will now describe my form of cylindrical bearing, of which Fig. 2 is a sectional view, and point out its advantages over the ordinary forms of cylindrical bearing. It is suitable for use not only when the axis of the shaft is horizontal, but also in any other position. The journal 6, 8, 10, 12 rotates in the journal box 7, 9, 11, 13. This journal is preferably cylindrical, as represented, in which case it may be the same as or similar to ordinary journals. It may also be conical, if desired. I form the journal box so that the clearance between its inner surface and the journal has a plurality of maximum points and a plurality of minimum points. For example, in the case represented in Fig. 2, the clearance near the four points 7, 9, 11 and 13 is only sufficient to admit a proper oil-film between the journal and the journal box. Near the points 6, 8, 10 and 12, however, the clearance is greater. In Fig. 2, the clearance is purposely exaggerated in order to show clearly its varying value. In practice the difference between the maximum and minimum clearances would usually be only a few thousandths of an inch. At or near the points of maximum clearance, or at other points, grooves, holes, or other suitable means of inlet may be provided in the journal box through which the oil or other lubricant is supplied. The lubricant thus introduced tends to be carried around by the rotation of the journal and forms an oil-film between the bearing surfaces. The skin friction of the moving journal combined with the effect of the viscosity of the lubricant and the gradually diminishing clearance produce wedges or films of oil in a forcible manner so that they can withstand heavy pressures without being broken or forced out.

In the particular form of my cylindrical bearing illustrated in Fig. 2, there are at least four portions of the journal surface where supporting oil-wedges or oil-films are formed; that is, between the point 6 of maximum clearance and the point 7 of minimum clearance such an oil-wedge exists as well as between the corresponding points 8 and 9, points 10 and 11, also points 12 and 13, assuming right-handed rotation of the journal. On the other hand, in the ordinary cylindrical bearing there is only one point of maximum and one point of minimum clearance. Hence in my bearings there is a much more frequent tendency to form and to maintain oil-wedges or oil-films which are essential to good lubrication.

Moreover, in my bearings there is a definite provision for forming oil films in the most effective manner, because the maximum and minimum clearance and the rate at which it varies may be made to suit the conditions of any particular duty. It is evident that the number of points of maximum and minimum clearance may also be altered according to circumstances. Instead of having four points of maximum clearance as in Fig. 2, there may be two, three, or any other desired number. It is obvious also that the points of maximum or of minimum clearance need not be equidistant or uniformly distributed or spaced in any particular way. For example, there may be more of such points in one semi-circumference than in the other. If desired they may be confined to a certain portion or portions of the circumference, depending upon the direction of the pressure to be sustained. In the particular form of my cylindrical bearing shown in Fig. 2 the journal is supported on all sides; that is, at all of the points of minimum clearance. Furthermore, there is a considerable area near each minimum point over which a supporting oil-wedge or oil-film is maintained. In the ordinary cylindrical bearing the journal is not supported in all directions. In fact, the journal is not held definitely in any position because there is usually a considerable clearance between the journal and journal box, as stated with reference to Fig. 1, to avoid overheating the oil, lowering its viscosity, and to reduce the chance of breaking down the oil-film, also to avoid the danger of seizing, all of which troubles are likely to occur with small clearance. In the case of steam turbines, for example, it is usually very desirable to keep the axis of the shaft in a definite position. To accomplish this by small clearance in the ordinary bearing involves the objections stated, whereas my bearing maintains exact alinement of the shaft and at the same time secures the advantages of comparatively large clearance.

The principal advantages of my horizontal bearings compared with the ordinary forms may be summed up as follows: First, there is a more frequent tendency to form and maintain oil-films. Second, definite provision is made to form and maintain oil-films, instead of leaving it to accidental conditions of clearance. Third, the number of points of maximum clearance as well as the difference between it and minimum clearance, also the rate at which it varies may all be made to suit the particular conditions of duty. Fourth, the journal may be supported practically on all sides or in any direction desired, whereas the position of the journal in the ordinary journal box is more or less indefinite.

In the form of my bearing represented in Fig. 2, the journal is shown circular in cross section and the cross section of the interior surface of the journal box departs from a true circle, being what may be called slightly undulating with respect thereto. In some cases, for various reasons such as convenience of construction, it may be preferable for the bore of the journal box to be of circular cross section, in which case the journal would have a cross section that is slightly undulating with reference to a perfect circle. Such a journal is indicated by the solid line in Fig. 3, the corresponding true circle being indicated by the dotted line. This form of journal can easily be made by well-known mechanical methods. If desired, certain portions of the original cylindrical surface of the journal may be left at and near the points 19, 21, 23 and 25 to form the actual bearing surfaces between which surfaces and the journal box there is minimum clearance. In other words these areas correspond to the minimum clearance areas in Fig. 2. The particular rate or rates at which the clearance varies from point to point may be modified to suit the conditions of service in each case.

In Fig. 4 is represented the cross section of a journal similar to that in Fig. 3, except that there are three points of minimum clearance instead of four. If desired, both the journal and the journal box of a bearing made according to my invention may be formed with slightly undulating surfaces. Furthermore, the number of undulations of the two surfaces may be the same or they may differ, and the amount of undulation or departure from a true circle may be greater for one than for the other.

In bearings made according to my invention, the slightly undulating surface formed on the journal or journal box, or both, may extend over the entire length of the journal or box or it may extend over only a portion of their length. For example, the undulation of the interior surface of the journal box represented in Fig. 2 may be omitted near the ends. That is to say, the bore of the journal box may be truly cylindrical for a certain distance at one end or at both ends. The diameter of this cylinder may correspond to or approximate the minimum diameter of the box. With this construction the end or ends of the journal box would surround the journal closely and thus tend to keep the oil or other lubricant from flowing out too freely. At the same time oil-films would naturally be formed at these portions of the bearing surfaces, so that proper lubrication would be maintained. If desired a rim of minimum clearance may be formed at only one end or at both ends of the journal box in order to retain the lubricant or retard its escape. The journals represented in Figs. 3 and 4 may be formed in a similar way, if desired. That it to say, the undulation of the surface may not be carried to the end or ends of the journal, which end or ends may be left truly cylindrical in section of the full diameter represented by the dotted circle in Fig. 3 or 4. This construction would tend to reduce the outward flow of oil from the ends of the journal box which may also be of truly cylindrical bore having minimum clearance with respect to the ends of the journal.

Before setting forth the application of my invention to vertical and thrust bearings, let us briefly consider the fundamental facts in regard to them: In an ordinary thrust bearing in which the thrust is exerted between two plane surfaces, the conditions are especially unfavorable for effective lubrication. Consider, for example, the bearing of an electric motor constructed to operate with its shaft vertical. In such a case the ordinary practice would be to sustain the vertical thrust due to the weight of the revolving parts by a collar or sleeve on the shaft bearing upon a stationary washer, or the end of the shaft is supported by a step bearing, the two thrust surfaces being flat, with grooves or recesses to admit oil. With this arrangement there is no real tendency to form or to maintain a film of oil between the bearing surfaces. Indeed, owing to the very fact that it is a thrust bearing, the pressure between the surfaces may be great enough to force out the oil from between them, or at least to prevent it from entering or forming a proper oil film. In some instances, bearings of this general type are designed so that the bearing surfaces are submerged in oil. Even in such a case, the pressure to force the oil out from between them is many pounds per square inch, whereas the pressure to force the oil in is that due to the hydrostatic head, being usually only a fraction of a pound per square inch.

In Figs. 5 and 6 representing a portion of a thrust bearing made in accordance with my invention, 37 is a section of a collar attached to a shaft and revolving with it. 39, 45 is a stationary washer upon which the collar bears,—that is, the thrust is exerted between the lower surface of the collar and the upper surface of the washer. In the particular construction shown in Figs. 5 and 6, the under surface of said collar is plane and the upper surface of the washer is made slightly undulating, as indicated.

If desired, in some cases this arrangement may be reversed, and in other cases both surfaces may be slightly undulating. With one or both surfaces thus formed and oil or other lubricant supplied thereto, it readily enters between the two surfaces where the clearance is considerable; for example, at or near the points 46, 47 and 48 in Fig. 6. In fact where the clearance is increasing in the direction of motion, there is a tendency to produce a vacuum and therefore to draw in the lubricant. The revolution of the collar 37 tends to carry the oil around to those portions of the bearing surfaces between which the clearance diminishes in the direction of motion, or is relatively small, forming supporting oil-wedges or oil-films or both that give effective lubrication. The entrance of oil may be facilitated by providing grooves or other inlets wherever desired, such as 46, 47 and 48. In the case of the bearing, part of which is shown in Figs. 5 and 6, the collar and washer are submerged in oil, so that it tends to flow wherever a channel is open to it. The oil having entered between the bearing surfaces where the clearance is increasing or is considerable, is carried around in a forcible manner by the skin friction of the moving collar and wedges itself between the bearing surfaces where the clearance is diminishing. This takes place at and near a plurality of points in my bearings. The frequent and positive formation of supporting oil-wedges and oil-films in my thrust bearings produces far better lubrication than is obtained by the use of the ordinary thrust bearings having flat bearing surfaces.

In Figs. 7 and 8 is illustrated a similar but more elaborate form of washer adapted to be used in a thrust bearing made in accordance with my invention. If desired, such a washer or collar may be provided with a rim around its outer circumference or a rim around its inner circumference, or both, the purpose of which is to retard the escape of oil from between the bearing surfaces. That is to say, the slight undulation of the surface of the washer or collar is not carried quite to its inner or outer edges, as indicated by the section in Fig. 9 and by the plan view in Fig. 10. Hence the surface of the rims thus formed lie in a true plane or approximate the same and they have small clearance with respect to the surface that bears upon them. If desired, a similar result may be obtained by providing a rim on one or both edges of the collar or washer so formed that it extends into or beyond the other bearing surface, as represented in Fig. 11.

The undulation of the bearing surfaces made according to my invention may be modified without departing therefrom. For example, in Fig. 12 I have represented the gradually varying clearance only on the decreasing sides, that is, the clearance diminishes gradually in the direction of motion where the supporting oil-wedges are formed in the tapering space between the surfaces. On the other sides of the areas approximating minimum clearance the clearance increases much more rapidly or suddenly as shown. Evidently this modification of my bearing surfaces is adapted to motion in one direction only. The journal box represented in Fig. 12, for example, is designed for clock-wise rotation of the journal. It is obvious that this modified form of undulating surface may be applied to thrust bearings such as are shown in Figs. 5, 6, 7 and 8. The sudden or rapid variations in clearance may begin at any desired point and may have any desired form or rates of variation.

In describing the various applications of my inventions I have assumed in general the employment of oil as the lubricant or medium through which the pressure is exerted between the bearing surfaces. It is obvious that grease or other suitable solid or some fluid other than oil may also be used, if desired. In fact, under certain circumstances even a vapor or gas may be the medium between bearing surfaces made in accordance with my invention. In each case the character of lubricant, also the amount, number, spacing and form of the undulations should be adapted to the size of the parts, the velocity of motion, pressure per unit area, and other conditions.

In general, it is obvious that my invention is not limited to the particular forms, sizes, proportions or arrangements of parts which I have shown and described. For example, it is evident that a form of bearing shown in a horizontal position may be used in a vertical position or vice-versa. My bearings may also be used in an inclined position. The various kinds of bearing surfaces made in accordance with my invention may be supplied with oil or other lubricant by means of a distribution or circulating system operating by gravity or by pressure obtained in any suitable manner. With such a system the bearing surfaces would be fed by the lubricant at the various points or areas where the clearance between them is considerable or is increasing. With such an arrangement the lubricant would be supplied not only by the effect of gravity or pressure obtained in any other way, but there would also be a tendency for the undulating bearing surfaces themselves to take in automatically a certain amount of lubricant, because they would act to a certain extent like a rotary pump. Hence the amount of lubricant would naturally increase with the speed, in which respect as well as in others my bearings are superior to the ordinary forms supplied with oil by a circulating system or the ordinary drop feed which furnish oil continuously with little or no regard to the speed or even when there is no relative motion of the bearing surfaces.

I claim:—

1. In a bearing the combination with a journal of a journal box, the surface of one of which is slightly undulating and is provided with a rim having practically minimum clearance with respect to the surface of the other.

2. In a bearing the combination with a journal of a journal box, the surface of one of which is slightly undulating and is provided with a rim on each side, having practically minimum clearance with respect to the surface of the other.

3. In a bearing a journal and a journal box the surfaces of which have a plurality of points at and near which the clearance between them approximates a minimum value, and a plurality of points at and near which the clearance approximates a maximum value, the former points being interspersed with respect to the latter and the variation from maximum to minimum clearance being gradual, in combination with means for supplying lubricant where the clearance increases or is considerable, and a rim on one of said surfaces having minimum clearance with respect to the other.

4. In a bearing a journal and a journal box the surfaces of which have a plurality of points at and near which the clearance between them approximates a minimum value, and a plurality of points at and near which the clearance approximates a maximum value, the former points being interspersed with respect to the latter and the variation of clearance from maximum to minimum and from minimum to maximum being gradual in both directions, in combination with inlets through which lubricant is supplied where the clearance increases or is considerable, and a rim on one of said surfaces having minimum clearance with respect to the other.

5. In a thrust bearing, the combination with a journal of a journal box the surface of one of which is slightly undulating and is provided with a rim having practically minimum clearance with respect to the other of said surfaces.

Signed at Ampere, in the county of Essex and State of New Jersey, this 10th day of May, A. D. 1913.

EDWARD H. WARING.

Witnesses:
 DEXTER N. FORCE, Jr.,
 ROBERT BELDEN TREAD.